United States Patent
Da Luz

(10) Patent No.: US 10,140,438 B2
(45) Date of Patent: Nov. 27, 2018

(54) HIDDEN SEPARATION AND ACCESS TO DATA ON A DEVICE

(71) Applicant: International Business Machines Corporation, Armonk, NY (US)

(72) Inventor: Laurence J. Da Luz, Attadale (AU)

(73) Assignee: International Business Machines Corporation, Armonk, NY (US)

( * ) Notice: Subject to any disclaimer, the term of this patent is extended or adjusted under 35 U.S.C. 154(b) by 68 days.

(21) Appl. No.: 14/970,850

(22) Filed: Dec. 16, 2015

(65) Prior Publication Data
US 2017/0177844 A1    Jun. 22, 2017

(51) Int. Cl.
G06F 21/31    (2013.01)
G06F 21/45    (2013.01)

(52) U.S. Cl.
CPC .............. *G06F 21/31* (2013.01); *G06F 21/45* (2013.01)

(58) Field of Classification Search
CPC .................................. G06F 21/31; G06F 21/45
See application file for complete search history.

(56) References Cited

U.S. PATENT DOCUMENTS

| | | | |
|---|---|---|---|
| 5,581,700 A | 12/1996 | Witte | |
| 6,212,372 B1 | 4/2001 | Julin | |
| 7,865,950 B2 * | 1/2011 | Lipetz | G06F 21/6218 713/182 |
| 13,634,425 | 1/2014 | Gorti et al. | |
| 9,071,618 B1 * | 6/2015 | Pruthi | H04L 63/105 |
| 9,104,850 B1 | 8/2015 | Braden | |
| 2005/0107114 A1 | 5/2005 | Ocock | |
| 2010/0319053 A1 | 12/2010 | Gharabally | |
| 2012/0079609 A1 | 3/2012 | Bender et al. | |
| 2014/0195927 A1 * | 7/2014 | DeWeese | H04L 63/10 715/750 |
| 2016/0149958 A1 * | 5/2016 | Singh | H04L 63/205 726/1 |

FOREIGN PATENT DOCUMENTS

| | | |
|---|---|---|
| WO | 0217353 A2 | 2/2002 |
| WO | 2014105549 A1 | 7/2014 |

OTHER PUBLICATIONS

Drogehorn et al., "Personalised Applications and Services for a mobile user", IEEE, 2005, pp. 473-479.
Glover et al., "Integrating device independence and user profiles on the Web", BT Technology Journal, vol. 23 ,No. 3, Jul. 2005, pp. 239-248.

* cited by examiner

*Primary Examiner* — Mohammed Waliullah
(74) *Attorney, Agent, or Firm* — Edward J. Wixted, III

(57) ABSTRACT

In an approach for accessing data and applications on a device, a processor adds a first accessibility profile and a second accessibility profile, wherein the first accessibility profile and the second accessibility profile are each associated with a single-user profile of a device. A processor configures a first level of access for the first accessibility profile and a second level of access for the second accessibility profile, wherein the first level of access includes a different level of accessibility permissions than the second level of access. A processor assigns a first password to access the first accessibility profile and a second password to access the second accessibility profile, wherein the first password and the second password are each associated with the single-user profile.

18 Claims, 3 Drawing Sheets

HIDDEN SEPARATION AND ACCESS TO DATA ON A DEVICE

BACKGROUND

The present invention relates generally to the field of profile access, and more particularly to varying accessibility settings of a user profile on a device based on a received input password of a plurality of passwords for the user profile.

Enterprise data management (EDM) refers to the ability of an organization to precisely define, easily integrate, and effectively retrieve data for both internal applications and external communication. EDM focuses on the creation of accurate, consistent, and transparent content. EDM emphasizes data precision, granularity and meaning and is concerned with how the content is integrated into business applications as well as how it is passed along from one business process to another. The goal of EDM is trust and confidence in data assets.

SUMMARY

Aspects of an embodiment of the present invention disclose a method, computer program product, and computing system for accessing data and applications on a device. A processor adds a first accessibility profile and a second accessibility profile, wherein the first accessibility profile and the second accessibility profile are each associated with a single-user profile of a device. A processor configures a first level of access for the first accessibility profile and a second level of access for the second accessibility profile, wherein the first level of access includes a different level of accessibility permissions than the second level of access. A processor assigns a first password to access the first accessibility profile and a second password to access the second accessibility profile, wherein the first password and the second password are each associated with the single-user profile.

DETAILED DESCRIPTION

With the current state of enterprise data management (EDM), bring your own device (BYOD) is an increasingly popular information technology (IT) policy that allows employees to use personal mobile devices to access enterprise data and systems. Embodiments of the present invention recognize that people openly share access to personal devices between family and friends, whether it be to use an application, play a game, make a phone call, etc. Embodiments of the present invention recognize that mobile devices are currently protected by a single password, which means an employee wanting to share access to the personal data on the personal device will inherently be risking the security of any enterprise data and systems to which the device is connected.

Additionally, embodiments of the present invention recognize that BYOD policies often state that no one but the employee is allowed to use the device once the device is registered within the company BYOD program, which can be an inconvenience for an employee who wants to ensure company data is secure but continue using the personal aspects of the device as normal.

Also, embodiments of the present invention recognize that a person may have a personal device with personal information that the person may not want to share with anyone else. A problem arises when another person, such as a friend, needs to use the personal device.

Embodiments of the present invention detail a program for varying accessibility settings of a user profile on a device based on a received input password of a plurality of passwords for the user profile.

Embodiments of the present invention will now be described in detail with reference to the Figures.

Figure 1:
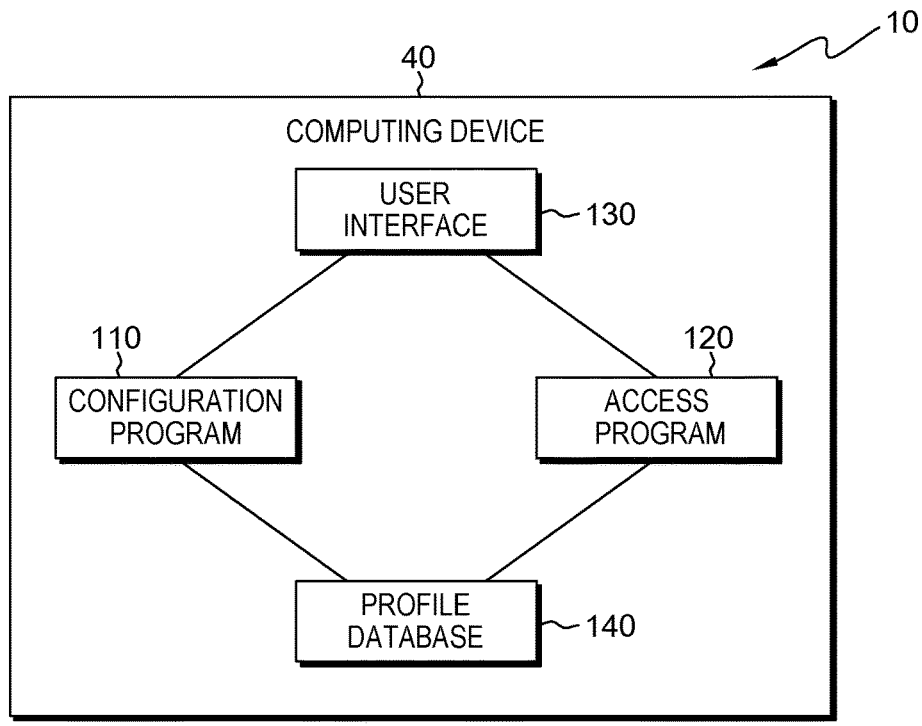
FIG. 1 depicts a block diagram of a computing system, in accordance with an embodiment of the present invention.

FIG. 1 depicts a block diagram of computing system 10, in accordance with one embodiment of the present invention. FIG. 1 provides an illustration of one embodiment and does not imply any limitations with regard to the environments in which different embodiments may be implemented.

In the depicted embodiment, computing system 10 includes computing device 40. In some embodiments, computing device 40 can send and receive information over a network. Such a network (not shown) may be a local area network (LAN), a wide area network (WAN) such as the Internet, a cellular data network, any combination thereof, or any combination of connections and protocols that will support communications between computing device 40 and other computing devices (not shown) that may send information to computing device 40 and/or receive information from computing device 40, in accordance with embodiments of the invention. Such a network may include wired, wireless, or fiber optic connections. Computing system 10 may include additional computing devices, servers, or other devices not shown.

Computing device 40 may be a personal device (e.g., mobile phone or smartphone), desktop computer, laptop computer, netbook computer, or tablet computer. In general, computing device 40 may be any electronic device or computing system capable of processing program instructions, sending and receiving data, and communicating with other devices over a network. In the depicted embodiment, computing device 40 contains configuration program 110, access program 120, user interface 130, and profile database 140. In other embodiments, computing device 40 may include other components, as depicted and described in further detail with respect to FIG. 4.

Configuration program 110 operates to allow a user to add new security profiles with assigned passwords within an account and configure the level of access for each security profile. In doing so, configuration program 110 adds a security profile. Configuration program 110 arranges a level of access for the security profile. Configuration program 110 assigns a password to access the security profile. In the depicted embodiment, configuration program 110 resides on computing device 40. In other embodiments, configuration program 110, or similar programs, may reside on another computing device or another server, provided that configuration program 110 can access user interface 130 and profile database 140 over a network.

Access program 120 allows access to a security profile through, for example, a lock screen, by entering the password that is assigned to the security profile. In doing so, access program 120 receives input of a password via a user entering the password at, for example, the lock screen. Access program 120 determines the entered password is a match to a stored password that is associated with a security profile. Access program 120 sets the security profile that is associated with the matched password. Access program 120 unlocks the device. In the depicted embodiment, access program 120 resides on computing device 40. In other embodiments, access program 120, or similar programs, may reside on another computing device or another server, provided that access program 120 can access user interface 130 and profile database 140 over a network.

User interface 130 may be any user interface used to access information from computing device 40, such as information gathered or produced by configuration program 110 or access program 120. In some embodiments, user interface 130 may be the touch screen of a computing device 40 (e.g., mobile phone). In other embodiments, user interface 130 may be a software program or application that enables a user at computing device 40 to access profile database 140.

Profile database 140 may be a repository that may be written to and/or read by configuration program 110 and access program 120. In some embodiments, configuration program 110 may allow a user to define various security profiles with associated passwords and store the security profiles and associated passwords to profile database 140. In other embodiments, profile database 140 may store already determined security profiles with associated passwords. In the depicted embodiment, profile database 140 resides on computing device 40. In other embodiments, profile database 140, or similar databases, may reside on another computing device or another server, provided that profile database 140 is accessible to configuration program 110 and access program 120 over a network.

Figure 2:
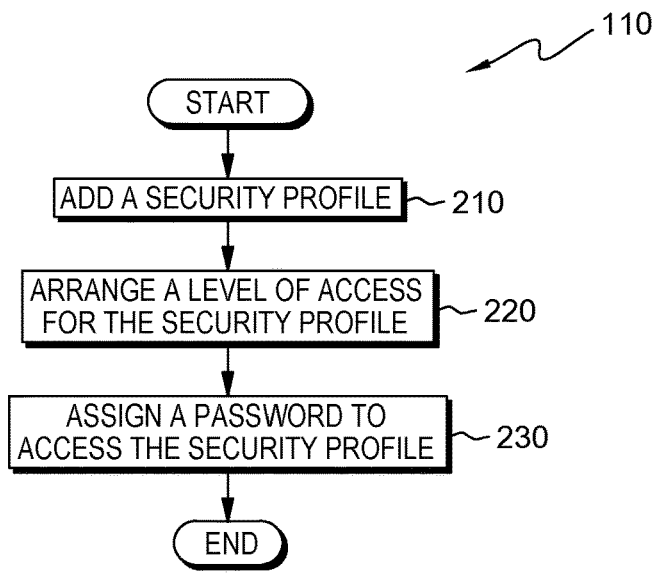
FIG. 2 depicts a flowchart of the steps of a configuration program, executing within the computing system of FIG. 1, for adding new security profiles with assigned passwords within an account and configuring the level of access for each security profile, in accordance with an embodiment of the present invention.

FIG. 2 depicts a flowchart of the steps of a configuration program, executing within the computing system of FIG. 1, in accordance with an embodiment of the present invention. Configuration program 110 adds new security profiles with assigned passwords within an account and configures the level of access for each security profile.

In step 210, configuration program 110 adds a security profile. A security profile, or profile, is a digital representation of a person's identity. A security profile can be used to store a description of the characteristics of a person. Additionally, a user profile is a visual display of data associated with a specific user, or a customized interface environment. The security profile is used to allow a user to access information within the user profile.

In one embodiment, configuration program 110 adds one security profile. In other embodiments, configuration program 110 adds multiple security profiles. In some embodiments, configuration program 110 adds a security profile, based on information input, by a user, utilizing user interface 130. Still, in other embodiments, configuration program 110 adds a security profile, based on a company policy that specifies certain enterprise applications need to be associated with a different password. For example, a company may issue a smartphone to their employees, and may instruct employees to create a personal password and a work password, wherein certain applications (e.g., company databases, VPN clients, company email) or files are only accessible when the smartphone is accessed via the work password. However, the personal password may be shared such that, as desired, other people may use features of the employee's company issued smartphone.

In step 220, configuration program 110 arranges a level of access for the security profile. Levels of access refer to the information that the user is ultimately able to access within computing device 40. In one embodiment, configuration program 110 arranges a level of access for the security profile that allows a user to access all data, applications, and features within computing device 40, for example, both personal and enterprise. In other embodiments, configuration program 110 arranges a level of access for the security profile that allows a user to access only personal data, applications, and features. In some embodiments, configuration program 110 arranges a level of access for the security profile, based on information input, by a user, into user interface 130.

In one embodiment, enterprise applications/data are hidden when the user logs in via the personal password, and there is no indication to the user that multiple passwords are accepted. The user accessing the limited portion of computing device 40 would not have any indication that the hidden enterprise applications/data exist on computing device 40. In other embodiments, enterprise applications are visible when the user logs in via the personal password, but the user is unable to click on, or otherwise access, the enterprise applications.

In one embodiment, configuration program 110 differentiates between different types of applications/data, such as between enterprise applications/data and personal applications/data by accessing a company database (not shown) indicating applications/data used by the company. In other embodiments, configuration program 110 differentiates between different types of applications/data, such as between enterprise applications/data and personal applications/data by the user indicates which applications/data belong to which category. In some embodiments, configuration program 110 differentiates between different types of applications/data, such as between enterprise applications/data and personal applications/data by accessing folders specifying files that are work files and files that are personal files.

In step 230, configuration program 110 assigns a password to access the security profile. Embodiments of the present invention require at least two passwords and any type of password may be used, such as, but not limited to: numeric, alphabet, alphanumeric, fingerprint, and retina scan. In general, any type of password known in the art may be utilized by embodiments of the present invention. In one embodiment, configuration program 110 assigns a password, based on a received password from the user. In some embodiments, configuration program 110 stores the security profile with the associated password to profile database 140.

Figure 3:
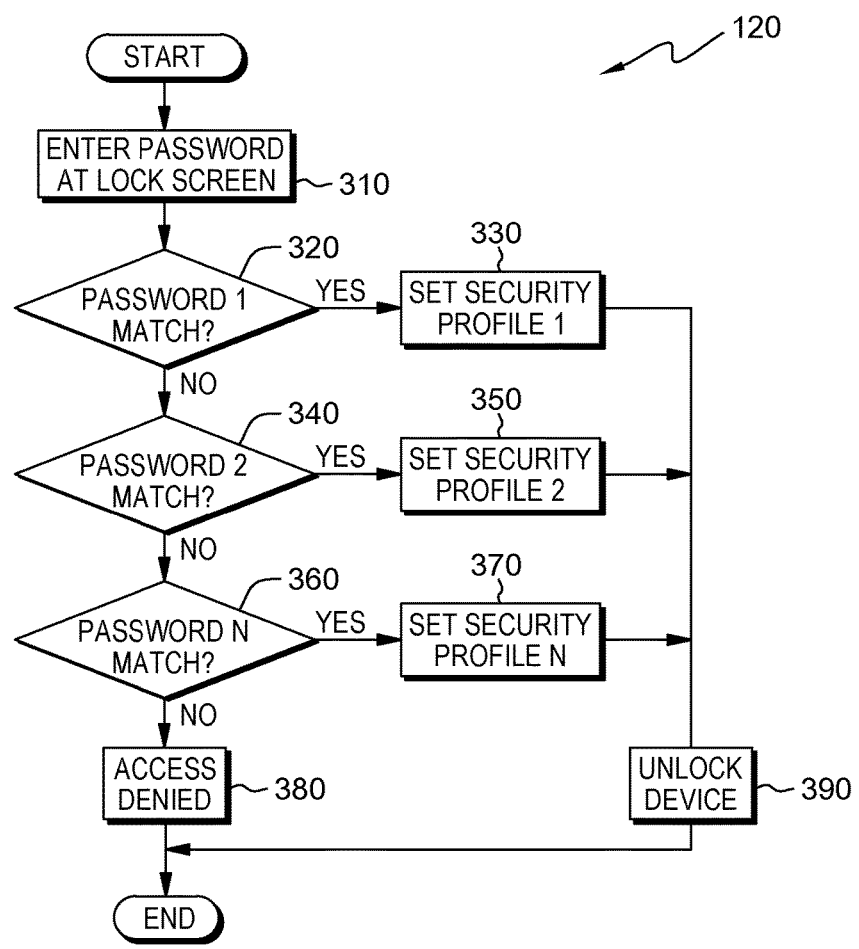
FIG. 3 depicts a flowchart of the steps of an access program, executing within the computing system of FIG. 1, for allowing access to a security profile through the lock screen by entering the password that is assigned to the security profile, in accordance with an embodiment of the present invention.

FIG. 3 depicts a flowchart of the steps of an access program, executing within the computing system of FIG. 1, in accordance with an embodiment of the present invention. Access program 120 allows access to a security profile through the lock screen by entering the password that is assigned to the security profile.

In step 310, access program 120 receives a password entered by a user at a lock screen, or other account access screen. In one embodiment, a user enters the password via user interface 130 of computing device 40.

In decision 320, access program 120 determines whether the received password is a match to "Password 1." Access program 120 makes the determination by comparing the received password to a stored "Password 1" in profile database 140. If access program 120 determines that "Password 1" is a match to the received password (decision 320, yes branch), access program 120 sets "Security Profile 1," which is retrieved from profile database 140 (step 330) and unlocks computing device 40 (step 390). In step 330, setting "Security Profile 1" means that access program 120 allows the user to have access to the data, applications, and features associated with "Security Profile 1." In step 390, unlocking computing device 40 means that computing device 40 is now accessible for use by the user. If access program 120 determines that "Password 1" is not a match to the received password (decision 320, no branch), access program 120 determines whether "Password 2," if applicable, is a match to the received password (decision 340).

In decision 340, access program 120 determines whether the received password is a match to "Password 2." Access program 120 makes the determination by comparing the received password to a stored "Password 2" in profile database 140. If access program 120 determines that "Password 2" is a match to the received password (decision 340, yes branch), access program 120 sets "Security Profile 2," which is retrieved from profile database 140 (step 350) and unlocks computing device 40 (step 390). In step 350, setting "Security Profile 2" means that access program 120 allows the user to have access to the data, applications, and features associated with "Security Profile 2." In step 390, unlocking computing device 40 means that computing device 40 is now available for use by the user. If access program 120 determines that "Password 2" is not a match to the received password (decision 340, no branch), access program 120 determines whether "Password n," if applicable, is a match to the received password (decision 360).

In decision 360, access program 120 determines whether the received password is a match to "Password n." Access program 120 makes the determination by comparing the received password to a stored "Password n" in profile database 140. If access program 120 determines that "Password n" is a match to the received password (decision 360, yes branch), access program 120 sets "Security Profile n," which is retrieved from profile database 140 (step 370) and unlocks computing device 40 (step 390). In step 370, setting "Security Profile n" means that access program 120 allows the user to have access to the data, applications, and features associated with "Security Profile n." In step 390, unlocking computing device 40 means that computing device 40 is now available for use by the user. If access program 120 determines that "Password n" is not a match to the received password (decision 360, no branch), access program 120 denies access (step 380).

As described, there may be any number of security profiles associated with a particular user profile or user device (e.g., computing device 40). Each security profile may have a different combination of application accessibility, data accessibility, administrative access, or other accessibility settings.

In step 380, access program 120 denies the user's access to computing device 40. In one embodiment, access program 120 displays a message that indicates the received password was incorrect or otherwise indicates that the access has been denied. In other embodiments, access program 120 returns to the lock screen to allow the user to input another password. In some embodiments, access program 120 locks computing device 40 and denies all access until the user obtains a resetting password from the service provider of computing device 40.

Embodiments of the present invention do not require "n" passwords. We contemplate an embodiment with only two passwords, despite the example depicted in FIG. 3 showing an embodiment with "n" passwords.

Figure 4:
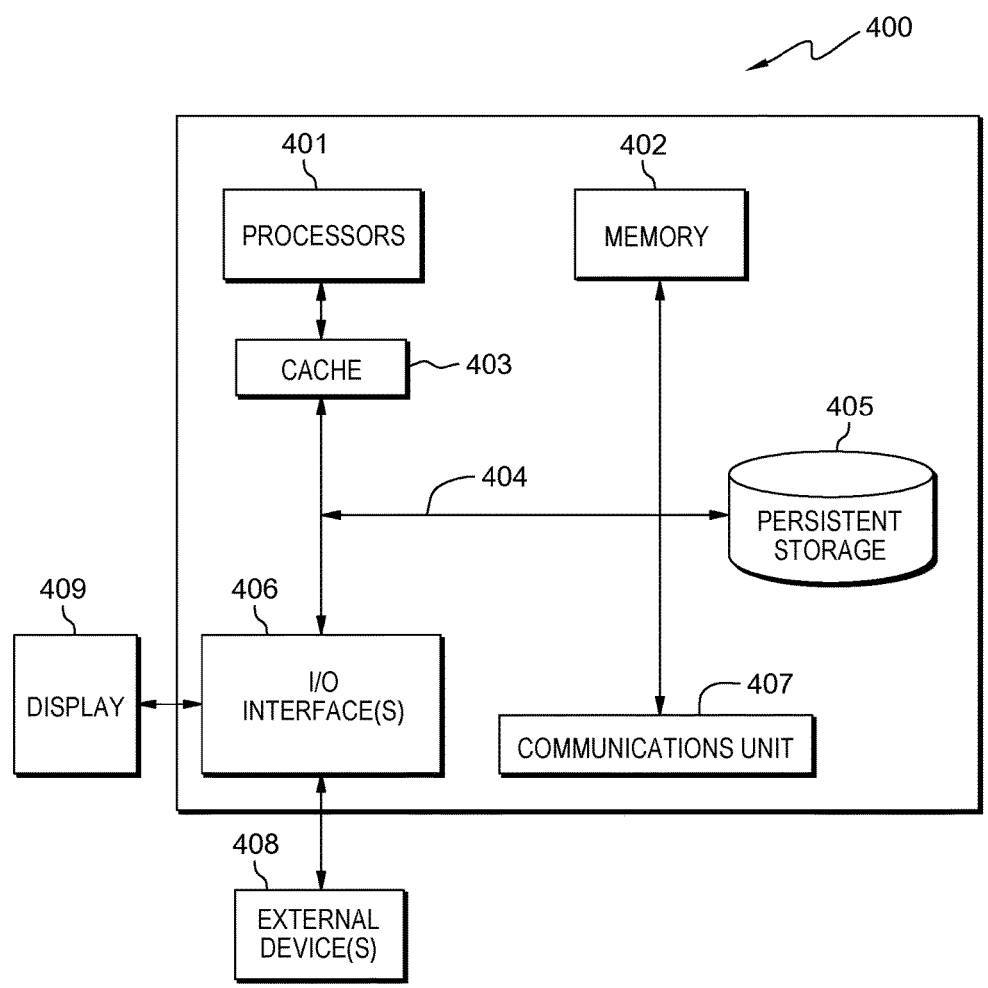
FIG. 4 depicts a block diagram of components of the computing device of FIG. 1, in accordance with an embodiment of the present invention.

FIG. 4 depicts computer system 400, which is an example of a system that includes components of computing device 40. Computer system 400 includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407. Configuration program 110, access program 120, user interface 130, and profile database 140 may be downloaded to persistent storage 405 of computing device 40 through communications unit 407 of computing device 40.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention, e.g., configuration program 110, access program 120, user interface 130, and profile database 140, can be stored on such portable computer readable storage media and can be loaded onto persistent storage 405 of computing device 40 via I/O interface(s) 406 of computing device 40. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for accessing data and applications on a device, the method comprising:
    adding, by one or more processors, a first accessibility profile and a second accessibility profile, based on a company policy that specifies enterprise data be associated with a different password than for personal data, wherein the first accessibility profile and the second accessibility profile are each associated with a single-user profile of a device, wherein the device is a single-user personal device;
    configuring, by one or more processors, a first level of access for the first accessibility profile and a second level of access for the second accessibility profile, wherein the first level of access includes a different level of accessibility permissions than the second level of access, and wherein the first level of access is associated with, both, enterprise and personal data and the second level of access is associated with only personal data;
    assigning, by one or more processors, a first password to access the first accessibility profile and a second password to access the second accessibility profile, wherein the first password and the second password are each associated with the single-user profile;
    receiving, by one or more processors, an input of a third password;
    determining, by one or more processors, that the third password does not match the first password;
    determining, by one or more processors, that the third password matches the second password; and
    granting, by one or more processors, access to the device according to the second level of access, based on the determination that the third password matches the second password, wherein the access granted includes, within a user interface, visible personal applications and visible enterprise applications, wherein a user is unable to access the visible enterprise applications, and wherein the user is unable to click on the visible enterprise applications.

2. The method of claim 1, further comprising:
    receiving, by one or more processors, an input of a fourth password;
    determining, by one or more processors, that the fourth password matches the first password; and
    granting, by one or more processors, access to the device according to the first level of access, based on the determination that the fourth password matches the first password.

3. The method of claim 1, further comprising:
    receiving, by one or more processors, an input of a fourth password;
    determining, by one or more processors, that the fourth password matches neither the first password nor the second password;
    denying, by one or more processors, access to the device.

4. The method of claim 1, wherein configuring the first level of access comprises:
    configuring, by one or more processors, the first level of access to grant full access to the device.

5. The method of claim 1, wherein configuring the second level of access comprises:
    configuring, by one or more processors, the second level of access to grant access to the device, wherein the access granted limits access to at least an application of the device.

6. The method of claim 1, wherein the enterprise data and the personal data are differentiated by accessing a company database that indicates the enterprise data used by the company.

7. The method of claim 1, wherein the enterprise data and the personal data are differentiated by user input as to what constitutes the enterprise data and what constitutes the personal data.

8. The method of claim 1, wherein the enterprise data and the personal data are differentiated by accessing folders, specifying files that are enterprise files and files that are personal files.

9. A computer program product for accessing data and applications on a device, the computer program product comprising:
    one or more computer readable storage media and program instructions stored on the one or more computer readable storage media, the program instructions comprising:
    program instructions to add a first accessibility profile and a second accessibility profile, based on a company policy that specifies enterprise data be associated with a different password than for personal data, wherein the first accessibility profile and the second accessibility profile are each associated with a single-user profile of a device, wherein the device is a single-user personal device;
    program instructions to configure a first level of access for the first accessibility profile and a second level of access for the second accessibility profile, wherein the first level of access includes a different level of accessibility permissions than the second level of access, and wherein the first level of access is associated with, both, enterprise and personal data and the second level of access is associated with only personal data; and
    program instructions to assign a first password to access the first accessibility profile and a second password to access the second accessibility profile, wherein the first password and the second password are each associated with the single-user profile;

program instructions to receive an input of a third password;

program instructions to determine that the third password does not match the first password;

program instructions to determine that the third password matches the second password; and program instructions to grant access to the device according to the second level of access, based on the determination that the third password matches the second password, wherein the access granted includes, within a user interface, visible personal applications and visible enterprise applications, wherein a user is unable to access the visible enterprise applications, and wherein the user is unable to click on the visible enterprise applications.

10. The computer program product of claim 9, further comprising:

program instructions, stored on the one or more computer readable storage media, to receive an input of a fourth password;

program instructions, stored on the one or more computer readable storage media, to determine that the fourth password matches the first password; and program instructions, stored on the one or more computer readable storage media, to grant access to the device according to the first level of access, based on the determination that the fourth password matches the first password.

11. The computer program product of claim 9, further comprising:

program instructions, stored on the one or more computer readable storage media, to receive an input of a fourth password;

program instructions, stored on the one or more computer readable storage media, to determine that the fourth password matches neither the first password nor the second password; and program instructions, stored on the one or more computer readable storage media, to deny access to the device.

12. The computer program product of claim 9, wherein program instructions to configure the first level of access comprise:

program instructions to configure the first level of access to grant full access to the device.

13. The computer program product of claim 9, wherein program instructions to configure the second level of access comprise:

program instructions to configure the second level of access to grant access to the device, wherein the access granted limits access to at least an application of the device.

14. A computer system for accessing data and applications on a device, the computer system comprising:

one or more computer processors, one or more computer readable storage media, and program instructions stored on the computer readable storage media for execution by at least one of the one or more processors, the program instructions comprising:

program instructions to add a first accessibility profile and a second accessibility profile, based on a company policy that specifies enterprise data be associated with a different password than for personal data, wherein the first accessibility profile and the second accessibility profile are each associated with a single-user profile of a device, wherein the device is a single-user personal device;

program instructions to configure a first level of access for the first accessibility profile and a second level of access for the second accessibility profile, wherein the first level of access includes a different level of accessibility permissions than the second level of access, and wherein the first level of access is associated with, both, enterprise and personal data and the second level of access is associated with only personal data; and program instructions to assign a first password to access the first accessibility profile and a second password to access the second accessibility profile, wherein the first password and the second password are each associated with the single-user profile;

program instructions to receive an input of a third password;

program instructions to determine that the third password does not match the first password;

program instructions to determine that the third password matches the second password; and program instructions to grant access to the device according to the second level of access, based on the determination that the third password matches the second password, wherein the access granted includes, within a user interface, visible personal applications and visible enterprise applications, wherein a user is unable to access the visible enterprise applications, and wherein the user is unable to click on the visible enterprise applications.

15. The computer system of claim 14, further comprising:

program instructions, stored on the computer readable storage media for execution by at least one of the one or more processors, to receive an input of a fourth password;

program instructions, stored on the computer readable storage media for execution by at least one of the one or more processors, to determine that the fourth password matches the first password; and program instructions, stored on the computer readable storage media for execution by at least one of the one or more processors, to grant access to the device according to the first level of access, based on the determination that the fourth password matches the first password.

16. The computer system of claim 14, further comprising:

program instructions, stored on the computer readable storage media for execution by at least one of the one or more processors, to receive an input of a fourth password;

program instructions, stored on the computer readable storage media for execution by at least one of the one or more processors, to determine that the fourth password matches neither the first password nor the second password; and program instructions, stored on the computer readable storage media for execution by at least one of the one or more processors, to deny access to the device.

17. The computer system of claim 14, wherein program instructions to configure the first level of access comprise:

program instructions to configure the first level of access to grant full access to the device.

18. The computer system of claim 14, wherein program instructions to configure the second level of access comprise:

program instructions to configure the second level of access to grant access to the device, wherein the access granted limits access to at least an application of the device.

* * * * *